US012636991B2

(12) United States Patent
Salter et al.

(10) Patent No.: US 12,636,991 B2
(45) Date of Patent:      May 26, 2026

(54) TAIL LIFT CONTROL SYSTEMS AND METHODS

(71) Applicant: Ford Global Technologies, LLC, Dearborn, MI (US)

(72) Inventors: Stuart C. Salter, White Lake, MI (US); Brendan Diamond, Grosse Pointe, MI (US); Rob Anthony Richardson, Galleywood (GB); Jon Holt, Howell, MI (US); Kyaw Kyaw Soe, Hintlesham (GB); Solomon Lin, Fort Wayne, IN (US)

( * ) Notice: Subject to any disclaimer, the term of this patent is extended or adjusted under 35 U.S.C. 154(b) by 365 days.

(21) Appl. No.: 18/328,380

(22) Filed: Jun. 2, 2023

(65) Prior Publication Data

US 2024/0399946 A1      Dec. 5, 2024

(51) Int. Cl.
| | |
|---|---|
| *G05D 1/00* | (2024.01) |
| *B60P 1/44* | (2006.01) |
| *B60Q 5/00* | (2006.01) |
| *G01G 19/08* | (2006.01) |

(52) U.S. Cl.
CPC ............ B60P 1/4471 (2013.01); B60Q 5/005 (2013.01); G01G 19/083 (2013.01)

(58) Field of Classification Search
CPC ..... B60P 1/4471; B60P 1/4428; B60P 1/4464; B60Q 5/005; B60Q 1/307; G01G 19/083; B62D 33/027
USPC ......................................................... 701/49
See application file for complete search history.

(56) References Cited

U.S. PATENT DOCUMENTS

2015/0291086 A1* 10/2015 Salter ..................... B60Q 1/307
362/485

FOREIGN PATENT DOCUMENTS

| | | |
|---|---|---|
| DE | 1052009052662 A1 | 5/2011 |
| DE | 102014014248 A1 | 3/2015 |
| DE | 102006062231 B4 | 2/2020 |
| DE | 102019117455 B3 * | 8/2020 |
| DE | 102019105787 A1 | 9/2020 |
| EP | 2832585 A1 * | 2/2015 ............ B60P 1/4471 |

(Continued)

OTHER PUBLICATIONS

Translation (Year: 2019).*

(Continued)

*Primary Examiner* — Aniss Chad
*Assistant Examiner* — Hussam Aldeen Alzateemeh
(74) *Attorney, Agent, or Firm* — Frank Lollo; Eversheds Sutherland (US) LLP

(57) ABSTRACT
A vehicle having a tail lift is disclosed. The tail lift may be configured to move between a retracted position and an extended position. The tail lift may be disposed perpendicular to a vehicle cargo bed in the retracted position, and parallel to the vehicle cargo bed in the extended position. The vehicle may further include a detection unit configured to detect a placement location of a cargo on the tail lift and presence of an obstruction in proximity to the tail lift. The vehicle may additionally include a processor that may obtain inputs from the detection unit when the tail lift may be in the extended position. The processor may determine that a predefined condition may be met based on the obtained inputs. The processor may further output a notification responsive to a determination that the predefined condition may be met.

20 Claims, 6 Drawing Sheets

(56)         References Cited

FOREIGN PATENT DOCUMENTS

WO          WO-0114167 A1 *   3/2001   ............ B60P 1/4471

OTHER PUBLICATIONS

Translation (Year: 2015).*
Translation (Year: 2001).*
Anand Thorat et al., Analysis of Mechanical Tail Lift Using Lead
Screw.

* cited by examiner

TAIL LIFT CONTROL SYSTEMS AND METHODS

FIELD

The present disclosure relates to tail lift control systems and methods, and more particularly to systems and methods to facilitate efficient loading and unloading of vehicle cargo by using a tail lift.

BACKGROUND

With the continued growth of internet-based commerce, package or cargo delivery is increasingly used to deliver goods to customers. Specifically in the US, e-commerce business is expected to continue to grow in the years to come.

Unprecedented growth is received favorably by e-commerce companies; however, the rapid growth also leads to operational challenges in the supply chain. E-commerce companies and their delivery partners deliver an ever-increasing number of packages per day, while reducing resource expenditure (e.g., delivery time, labor, etc.).

To ensure efficient loading and unloading of packages in commercial delivery vehicles and to ease load on vehicle users, many E-commerce companies and their delivery partners install tail lifts or lift gates on the vehicles. A tail lift is typically installed at a vehicle rear portion, and assists a vehicle user in conveniently lifting heavy cargo from ground to vehicle cargo bed, and unloading the cargo from the vehicle cargo bed back to the ground.

While tail lifts may provide benefits to the vehicle users, there are known instances of adverse incidents related to the tail lifts. For example, the cargo may slip or roll off the tail lift when the cargo may not be placed at an optimal position on the tail lift. Thus, there is a need for a system and a method that may assist the vehicle user in operating the tail lift.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
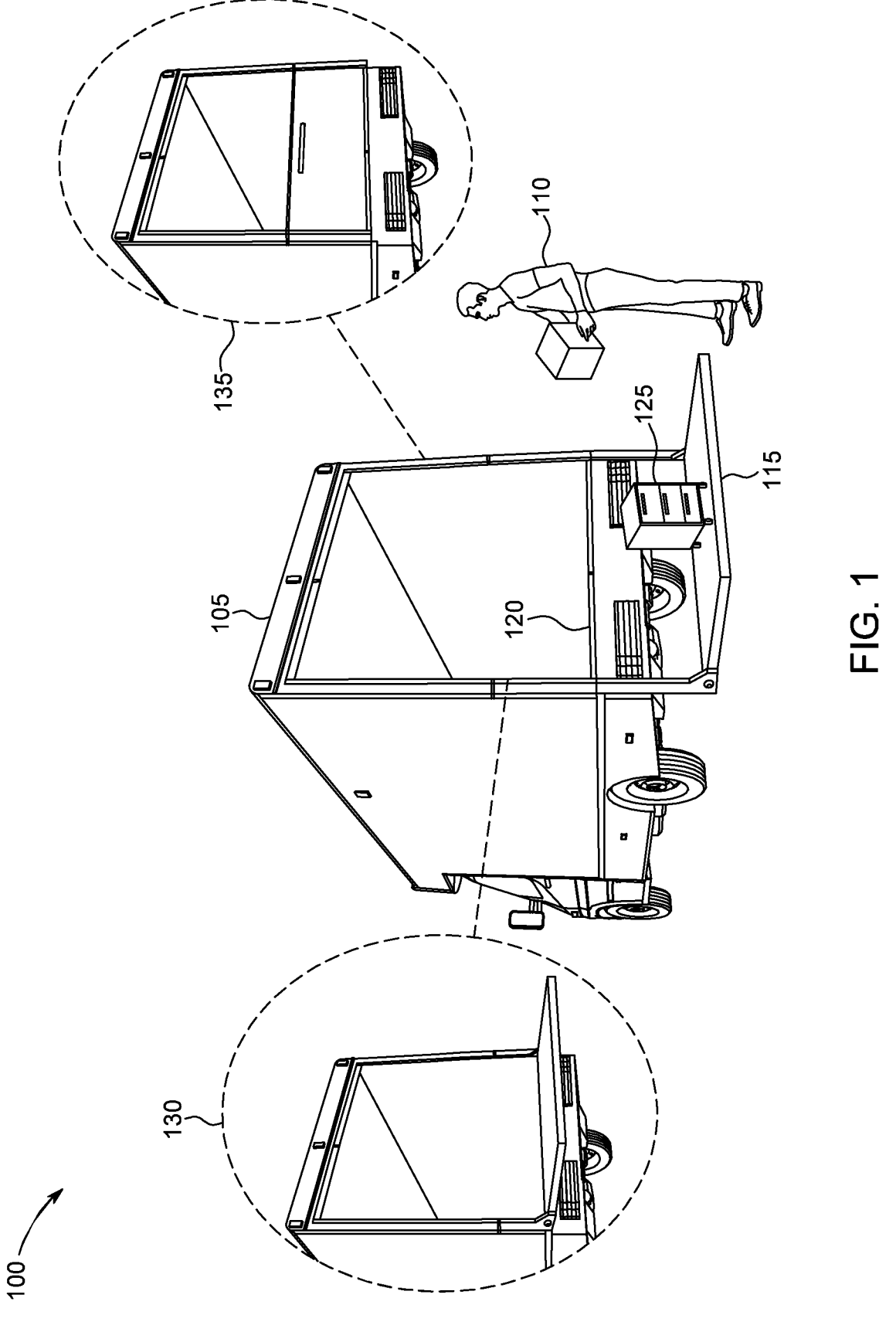
FIG. 1 depicts an example environment in which techniques and structures for providing the systems and methods disclosed herein may be implemented.

The present disclosure describes a delivery vehicle having a tail lift attached to a vehicle rear portion. The tail lift may assist a user in loading/unloading cargo to/from a vehicle cargo bed. The tail lift may be configured to move between a retracted position and an extended position. In some aspects, the tail lift may be disposed parallel to the vehicle cargo bed and in proximity to ground in the extended position, and perpendicular to the vehicle cargo bed and in proximity to the vehicle cargo bed in the retracted position. The user may dispose/place the cargo on the tail lift when the tail lift may be in the extracted position and may then send a command to the vehicle to vertically move the tail lift to an elevated position at which the tail lift may be disposed adjacent to the vehicle cargo bed. The user may then load the cargo from the tail lift to the vehicle cargo bed, when the tail lift may be in the elevated position. The user may send multiple commands to the vehicle to move the tail lift iteratively between the extended position and the elevated position, till all cargo packages may be loaded in the vehicle cargo bed. Responsive to all cargo packages being loaded in the vehicle cargo bed, the user may send a command to the vehicle to move and lock the tail lift in the retracted position. The user may drive the vehicle (e.g., to deliver the cargo packages to respective destinations) when the tail lift may be locked at the retracted position. The user may command the vehicle to perform similar tail lift movement (in reverse) when the user may be unloading the cargo from the vehicle cargo bed.

In some aspects, the vehicle may perform one or more operations to facilitate the user in the cargo loading/unloading operation. For example, the vehicle may automatically move the tail lift from the retracted position to the extended position when the user exits the vehicle and moves or looks towards the tail lift at the vehicle rear position. In some aspects, the vehicle may automatically move the tail lift from the retracted position to the extended position when the user activates a "cargo loading/unloading mode" on the vehicle. Further, the vehicle may automatically move the tail lift from the retracted position to the extended position by tracking user location and movement in proximity to the vehicle by using vehicle interior and exterior cameras, and/or vehicle radar sensors. The vehicle may further actuate one or more vehicle interior and/or exterior lights to make it easier for the user to load/unload the cargo, based on the user location in proximity to the vehicle, ambient light brightness and/or vehicle interior portion light brightness (as detected by the vehicle cameras).

In further aspects, responsive to moving the tail lift to the extended position, the vehicle may adjust vehicle cargo bed pitch and/or tail lift pitch when the vehicle determines that the vehicle cargo bed pitch and/or the tail lift pitch may be outside a predefined pitch range. The vehicle may adjust the vehicle cargo bed pitch and/or the tail lift pitch to facilitate the user in conveniently loading/unloading the cargo.

In further aspects, the vehicle may additionally determine whether the user has placed the cargo at an optimal position on the tail lift based on the inputs obtained from the vehicle cameras and/or the radar sensors. For example, the vehicle may determine if the user has placed the cargo at a location that may be deviated from an optimal tail lift center position by more than a predefined deviation threshold. The vehicle may output an alert notification, via a vehicle speaker or a user device, instructing the user to adjust cargo placement location on the tail lift when the vehicle determines that the cargo may not be placed optimally in proximity to the tail lift center position.

In further aspects, the vehicle may determine presence of an obstruction in proximity to the tail lift based on the inputs obtained from the vehicle cameras and/or the radar sensors. The obstruction may be, for example, a person different from the vehicle user or an obstructing object (e.g., a rope) that may be disposed on the tail lift. Responsive to determining obstruction presence, the vehicle may output another alert notification instructing the obstruction to be moved away from the tail lift.

The vehicle may be further configured to determine cargo weight that may be disposed on the tail lift. The vehicle may output yet another alert notification instructing the user to reduce the cargo weight when the cargo weight disposed on the tail lift may be greater than a predefined weight threshold.

The vehicle may be additionally configured to adjust the tail lift pitch when the tail lift may be moving between the extended position and the elevated position, to prevent the cargo from slipping off or tipping from the tail lift.

The present disclosure discloses a delivery vehicle that facilitates the user in loading/unloading the cargo to/from the vehicle cargo bed. The vehicle automatically unlocks and unfolds the tail lift from the retracted position to the extended position based on user location, thereby enhancing user convenience of operating the tail lift. The vehicle further actuates vehicle lights based on the user location, ambient light brightness, and vehicle interior portion light brightness, thus making it is easy for the user to conveniently load/unload the cargo. Furthermore, the vehicle outputs one or more alert notifications for the user when the vehicle determines that the user may not have optimally placed the cargo on the tail lift, an obstruction may be present in proximity to the tail lift, and/or the cargo weight may be greater than the predefined weight threshold. The alert notifications may assist the user in preventing any adverse incident related to the tail lift and/or the cargo.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a delivery vehicle 105 that may be a truck, a van (including walk-in vans), a truck trailer, and/or the like. In some aspects, the vehicle 105 may be an autonomous vehicle. In other aspects, a driver (e.g., a vehicle user 110) may operate the vehicle 105.

The vehicle 105 may include a tail lift 115 that may be disposed at a vehicle rear portion, as shown in FIG. 1. The user 110 may use the tail lift 115 to load/unload cargo or delivery packages to/from a vehicle cargo bed 120. The tail lift 115 may be configured to move between a retracted position, an elevated position, and an extended position to facilitate the user 110 in loading/unloading cargo to/from the vehicle cargo bed 120.

An exemplary tail lift extended position is shown in FIG. 1. In the extended position, the tail lift 115 may be disposed in proximity to ground and parallel to the vehicle cargo bed 120 (and the ground). The user 110 may place or dispose a cargo 125 (e.g., a cargo trolley or a heavy delivery package) on the tail lift 115 when the tail lift 115 may be in the extended position. Responsive to placing the cargo 125 on the tail lift 115, the user 110 may send a command to the vehicle 105 to move the tail lift 115 vertically up in the elevated position. In some aspects, the tail lift 115 may be disposed adjacent to the vehicle cargo bed 120 and away from the ground in the elevated position, as shown in view 130 of FIG. 1. Further, the tail lift 115 may remain parallel to the vehicle cargo bed 120 (and the ground) in the elevated position, which may ensure that the cargo 125 may not slip or roll off the tail lift 115 when the tail lift 115 moves up vertically.

In some aspects, the user 110 may send the command to the vehicle 105 to move the tail lift 115 from the extended position to the elevated position via a user device (shown as user device 204 in FIG. 2), gesture command, audio command, or by mechanically actuating a tail lift actuator (not shown) that may be disposed at the vehicle rear portion or on the tail lift 115. The vehicle 105 may include a tail lift control system (shown as tail lift control system 214 in FIG. 2) that may receive the command, and may actuate tail lift movement from the extended position to the elevated position responsive to receiving the command from the user 110.

In some aspects, the user 110 may stand on the tail lift 115 when the tail lift 115 may be moving from the extended position to the elevated position. Responsive to the tail lift 115 reaching the elevated position, the tail lift control system may lock the tail lift 115 in the elevated position by using one or more tail lift locks (not shown) that may be disposed at the vehicle rear portion (e.g., at left and/or right-side edges of the vehicle rear portion). The user 110 may move the cargo 125 from the tail lift 115 to the vehicle cargo bed 120 when the tail lift 115 may be locked in the elevated position. The user 110 may send another command to the vehicle 105 to move the tail lift 115 from the elevated position back to the extended position if the user 110 desires to load further cargo packages in the vehicle cargo bed 120. The user 110 may send multiple commands to iteratively move the tail lift 115 between the elevated position and the extended position till all the cargo packages may be loaded in the vehicle cargo bed 120.

When all the cargo packages may be loaded in the vehicle cargo bed 120, the user 110 may further send another command to the vehicle 105 to move the tail lift 115 from the elevated position to the retracted position. The tail lift 115 may be disposed perpendicular to and in proximity to the vehicle cargo bed 120 in the retracted position, as shown in view 135 of FIG. 1. Responsive to receiving the other command from the user 110, the tail lift control system may move the tail lift 115 from the elevated position to the retracted position, and lock the tail lift 115 in the retracted position by using the tail lift locks. Locking the tail lift 115 may ensure that the cargo packages stored in the vehicle cargo bed 120 may not roll off or slip out of the vehicle cargo bed 120, when the vehicle 105 may be moving. The user 110 may drive the vehicle 105 or enable the vehicle 105 to move (e.g., if the vehicle 105 is an autonomous vehicle) when the tail lift 115 may be locked in the retracted position.

The user 110 may follow a similar process (in reverse) to unload the cargo 125 from the vehicle cargo bed 120. In this manner, the vehicle 105 may facilitate the user 110 to conveniently load/unload the cargo 125 to/from the vehicle cargo bed 120, without requiring the user 110 to manually lift the cargo 125 from the ground and/or the vehicle cargo bed 120.

The vehicle 105 may be configured to perform additional operations/steps to facilitate convenient loading/unloading of cargo to/from the vehicle cargo bed 120. For example, the vehicle 105 may automatically move the tail lift 115 from the retracted position to the extended position when the user 110 may be expected to load or unload cargo to/from the vehicle cargo bed 120. Further, the vehicle 105 may automatically switch ON one or more vehicle exterior or interior lights based on ambient light brightness, vehicle interior portion light brightness, and user location in proximity to the vehicle 202 to make it easier for the user 110 to load/unload cargo packages. Furthermore, the vehicle 105 may adjust vehicle pitch (or vehicle cargo bed pitch) and/or tail lift pitch when the vehicle pitch and/or the tail lift pitch may not be within a predefined pitch range. For example, the vehicle 105 may determine a vehicle cargo bed inclination angle and/or a tail lift inclination angle relative to the ground, and may automatically adjust vehicle cargo bed inclination or a tail lift inclination when respective inclination angles may be greater than a predefined inclination angle threshold.

In additional aspects, the vehicle 105 may determine, via one or more vehicle cameras and/or sensors, whether the user 110 has correctly placed the cargo 125 on the tail lift 115 when the tail lift 115 may be in the extended position. The vehicle 105 may output an alert notification (e.g., via a vehicle speaker or Human-Machine Interface (HMI), or via a user device) when the cargo 125 may not be correctly placed on the tail lift 115. Further, the vehicle 105 may determine, via the vehicle cameras (e.g., vehicle exterior cameras), whether an obstruction or a pedestrian may be present within a predefined range of the tail lift 115 when the tail lift 115 may be in the extended position. The vehicle 105 may output the alert notification when the obstruction and/or the pedestrian may be present within the predefined range of the tail lift 115. The vehicle 105 may further determine if cargo weight disposed on the tail lift 115 may be greater than a permissible or predefined tail lift weight capacity. The vehicle 105 may output the alert notification when the weight may be greater than the permissible tail lift weight capacity.

The alert notification may instruct the user 110 to perform one or more remedial actions, e.g., correct cargo placement location on the tail lift 115, remove the obstruction, reduce cargo weight, etc. In some aspects, the vehicle 105 may not enable tail lift movement and/or vehicle movement till the user 110 performs the remedial actions responsive to receiving the alert notification. These and other vehicle operations that facilitate the user 110 to load/unload cargo to/from the vehicle cargo bed 120 are described in detail below in conjunction with FIG. 2.

The vehicle 105 and/or the user 110 implements and/or performs operations, as described here in the present disclosure, in accordance with the owner manual and safety guidelines.

Figure 2:
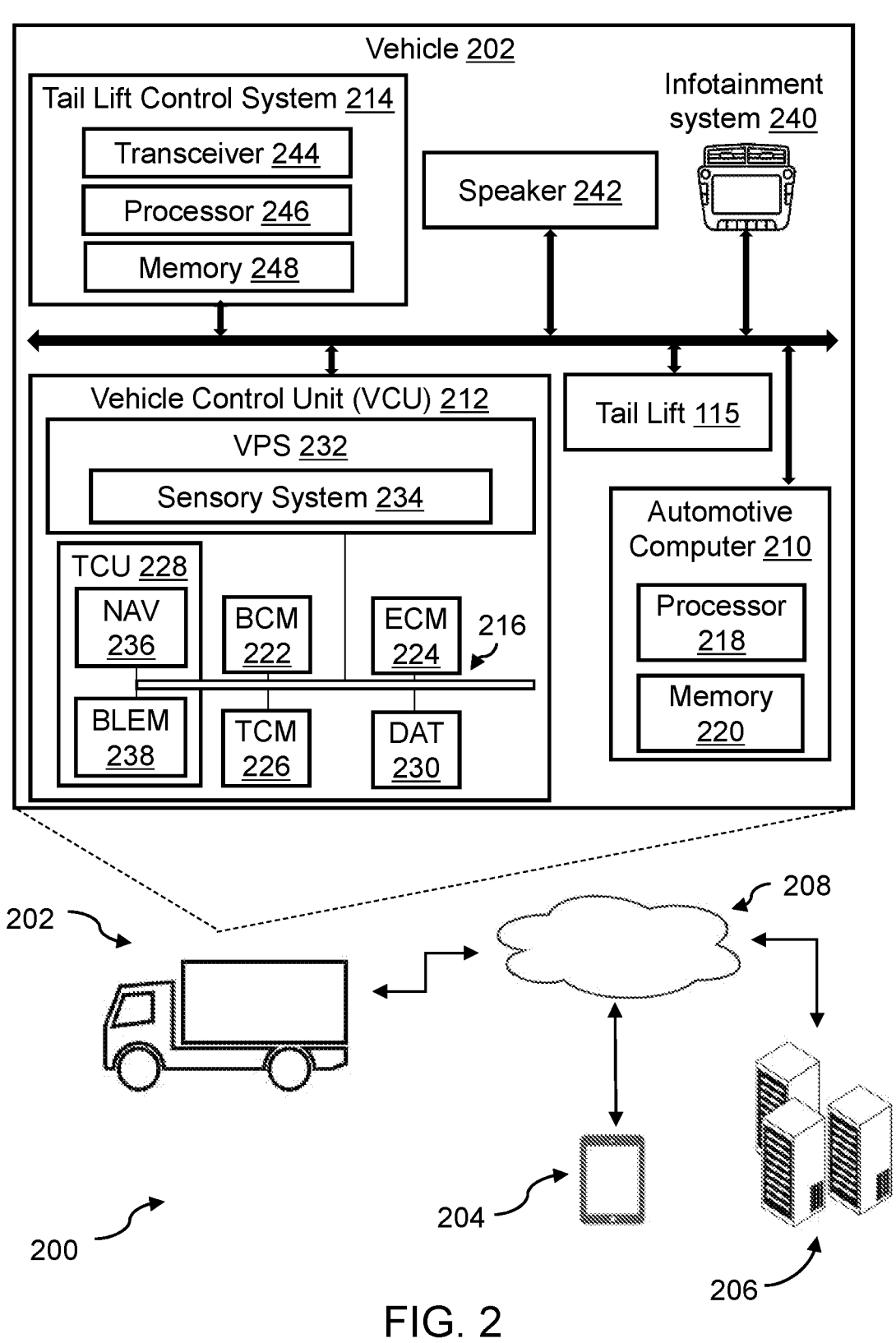
FIG. 2 depicts a block diagram of an example system to facilitate loading and unloading of vehicle cargo by using a tail lift in accordance with the present disclosure.

FIG. 2 depicts a block diagram of an example system 200 to facilitate loading and unloading of vehicle cargo (e.g., the cargo 125) by using the tail lift 115 in accordance with the present disclosure. While describing FIG. 2, references may be made to FIGS. 3-5.

The system 200 may include a vehicle 202, a user device 204, and one or more servers 206 communicatively coupled with each other via one or more networks 208. The vehicle 202 may be same as the vehicle 105 described in conjunction with FIG. 1. The user device 204 may be associated with the user 110, and may include, but is not limited to, a mobile phone, a laptop, a computer, a tablet, a wearable device, or any other similar device with communication capabilities.

The server(s) 206 may be part of a cloud-based computing infrastructure and may be associated with and/or include a Telematics Service Delivery Network (SDN) that provides digital data services to the vehicle 202 and other vehicles (not shown in FIG. 2) that may be part of a commercial vehicle fleet. In this case, a vehicle fleet operator (not shown) may operate the server(s) 206.

The network(s) 208 illustrates an example communication infrastructure in which the connected devices discussed in various embodiments of this disclosure may communicate. The network(s) 208 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units including, but not limited to, an automotive computer 210, a Vehicle Control Unit (VCU) 212, and a tail lift control system 214. The VCU 212 may include a plurality of Electronic Control Units (ECUs) 216 disposed in communication with the automotive computer 210.

The user device 204 may connect with the automotive computer 210 and/or the tail lift control system 214 via the network 208, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques.

In some aspects, the automotive computer 210 and/or the tail lift control system 214 may be installed in a vehicle engine compartment (or elsewhere in the vehicle 202), in accordance with the disclosure. Further, the automotive computer 210 may operate as a functional part of the tail lift control system 214. The automotive computer 210 may be or include an electronic vehicle controller, having one or more processor(s) 218 and a memory 220. Moreover, the tail lift control system 214 may be separate from the automotive computer 210 (as shown in FIG. 2) or may be integrated as part of the automotive computer 210.

The processor(s) 218 may be disposed in communication with one or more memory devices disposed in communication with the respective computing systems (e.g., the memory 220 and/or one or more external databases not shown in FIG. 2). The processor(s) 218 may utilize the memory 220 to store programs in code and/or to store data for performing aspects in accordance with the disclosure. The memory 220 may be a non-transitory computer-readable memory storing a tail lift control program code. The memory 220 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 212 may share a power bus with the automotive computer 210 and may be configured and/or programmed to coordinate the data between vehicle 202 systems, connected servers (e.g., the server(s) 206), and other vehicles (not shown in FIG. 2) operating as part of a vehicle fleet. The VCU 212 can include or communicate with any combination of the ECUs 216, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 212 may further include and/or communicate with a Vehicle Perception System (VPS) 232, having connectivity with and/or control of one or more vehicle sensory system(s) 234. The sensory system 234 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging (LiDAR or "lidar") sensor, door sensors, proximity sensors, temperature sensors, wheel sensors, tail lift weight sensors, vehicle cargo bed weight sensors, ambient weather sensors, vehicle wheel sensors, vehicle internal and external cameras, etc. In some aspects, the tail lift weight sensors may be load/strain sensors that may be configured to determine cargo weight disposed on the tail lift 115 when the tail lift 115 may be lifted vertically up from the extended position. The tail lift weight sensors may determine cargo weight based on hydraulic pressure or power needed to lift the tail lift 115 including the cargo 125. The vehicle cargo bed weight sensors may be configured to determine cargo weight disposed on the vehicle cargo bed 120.

In some aspects, the VCU 212 may control vehicle operational aspects and implement one or more instruction sets received from the user device 204, from one or more instruction sets stored in the memory 220, including instructions operational as part of the tail lift control system 214.

The TCU 228 can be configured and/or programmed to provide vehicle connectivity to wireless computing systems onboard and off board the vehicle 202, and may include a Navigation (NAV) receiver 236 for receiving and processing a GPS signal, a BLE® Module (BLEM) 238, a Wi-Fi transceiver, a UWB transceiver, and/or other wireless transceivers (not shown in FIG. 2) that may be configurable for wireless communication between the vehicle 202 and other systems (e.g., a vehicle key fob, not shown in FIG. 2), computers, and modules. The TCU 228 may be disposed in communication with the ECUs 216 by way of a bus.

The ECUs 216 may control aspects of vehicle operation and communication using inputs from human drivers, inputs from an autonomous vehicle controller, the tail lift control system 214, and/or via wireless signal inputs received via the wireless connection(s) from other connected devices, such as the user device 204, the server(s) 206, among others.

The BCM 222 generally includes integration of sensors, vehicle performance indicators, and variable reactors associated with vehicle systems, and may include processor-based power distribution circuitry that can control functions associated with the vehicle body such as lights, windows, security, camera(s), audio system(s), speakers, door locks and access control, and various comfort controls. The BCM 222 may also operate as a gateway for bus and network interfaces to interact with remote ECUs (not shown in FIG. 2).

The DAT controller 230 may provide Level-1 through Level-3 automated driving and driver assistance functionality that can include, for example, active parking assistance, vehicle backup assistance, adaptive cruise control, and/or lane keeping, among other features. The DAT controller 230 may also provide aspects of user and environmental inputs usable for user authentication.

In some aspects, the automotive computer 210 may connect with an infotainment system 240 and a vehicle external speaker 242. The automotive computer 210 and/or the tail lift control system 214 may control operation of the speaker 242 via the BCM 222. The infotainment system 240 may include a touchscreen interface portion, and may include voice recognition features, biometric identification capabilities that can identify users based on facial recognition, voice recognition, fingerprint identification, or other biological identification means. In other aspects, the infotainment system 240 may be further configured to receive user instructions via the touchscreen interface portion, and/or display notifications, navigation maps, etc. on the touchscreen interface portion.

The computing system architecture of the automotive computer 210, the VCU 212, and/or the tail lift control system 214 may omit certain computing modules. It should be readily understood that the computing environment depicted in FIG. 2 is an example of a possible implementation according to the present disclosure, and thus, it should not be considered limiting or exclusive.

In accordance with some aspects, the tail lift control system 214 may be integrated with and/or executed as part of the ECUs 216. The tail lift control system 214, regardless of whether it is integrated with the automotive computer 210 or the ECUs 216, or whether it operates as an independent computing system in the vehicle 202, may include a transceiver 244, a processor 246, and a computer-readable memory 248.

The transceiver 244 may be configured to receive information/inputs from one or more external devices or systems, e.g., the user device 204, the server(s) 206, and/or the like via the network 208. Further, the transceiver 244 may transmit notifications (e.g., alert/alarm signals) to the external devices or systems. In addition, the transceiver 244 may be configured to receive information/inputs from vehicle 202 components such as the infotainment system 240, the sensory system 234, and/or the like. Further, the transceiver 244 may transmit notifications (e.g., alert/alarm signals) to the vehicle 202 components such as the infotainment system 240, the speaker 242, etc.

The processor 246 and the memory 248 may be same as or similar to the processor(s) 218 and the memory 220, respectively. Specifically, the processor 246 may utilize the memory 248 to store programs in code and/or to store data for performing aspects in accordance with the disclosure. The memory 248 may be a non-transitory computer-readable memory storing the tail lift control code. In some aspects, the memory 248 may additionally store information associated with the vehicle 202 and one or more sensory inputs received from the sensory system 234 (e.g., inputs received from the tail lift weight sensors, the interior or exterior vehicle cameras, the radar sensors, light sensors etc.).

In operation, the user 110 may activate a "vehicle cargo loading/unloading" mode when the user 110 desires to load/unload the cargo 125 to/from the vehicle cargo bed 120. In some aspects, the user 110 may activate the vehicle cargo loading/unloading mode when the tail lift 115 may be in the retracted position. The user 110 may activate the vehicle cargo loading/unloading mode by using the user device 204, the infotainment system 240 (or vehicle HMI), or a dedicated loading/unloading mode actuator (not shown) that may be disposed in the vehicle 202. Responsive to the user 110 actuating the vehicle cargo loading/unloading mode, the user device 204 (via the network 208), the infotainment system 240, or the mode actuator may transmit a trigger signal to the transceiver 244. The transceiver 244 may receive the trigger signal, and may send the trigger signal to the processor 246.

Responsive to obtaining the trigger signal, the processor 246 may track, via the sensory system 234, user movement in proximity to the vehicle 202 to automatically move the tail lift 115 from the retracted position to the extended position. Specifically, responsive to obtaining the trigger signal, the processor 246 may obtain inputs from the vehicle interior and/or exterior cameras and the radar sensors (which may collectively be referred to as a "first detection unit") that may be part of the sensory system 234, to detect user location in proximity to the vehicle 202 and track user movement as the user 110 exits the vehicle 202 and moves towards the vehicle rear portion. Based on the inputs received from the first detection unit, the processor 246 may determine when the user 110 reaches the vehicle rear portion and looks towards the tail lift 115. Responsive to determining that the user 110 may have reached the vehicle rear portion and may be looking towards the tail lift 115, the processor 246 may automatically unlock the tail lift 115 by using the tail lift locks (described in conjunction with FIG. 1) and move the tail lift 115 from the retracted position to the extended position. In some aspects, in addition to moving the tail lift 115 to the extended position, the processor 246 may automatically unlock cargo access door (not shown), if the vehicle 202 is equipped with the cargo access door.

Figure 3:
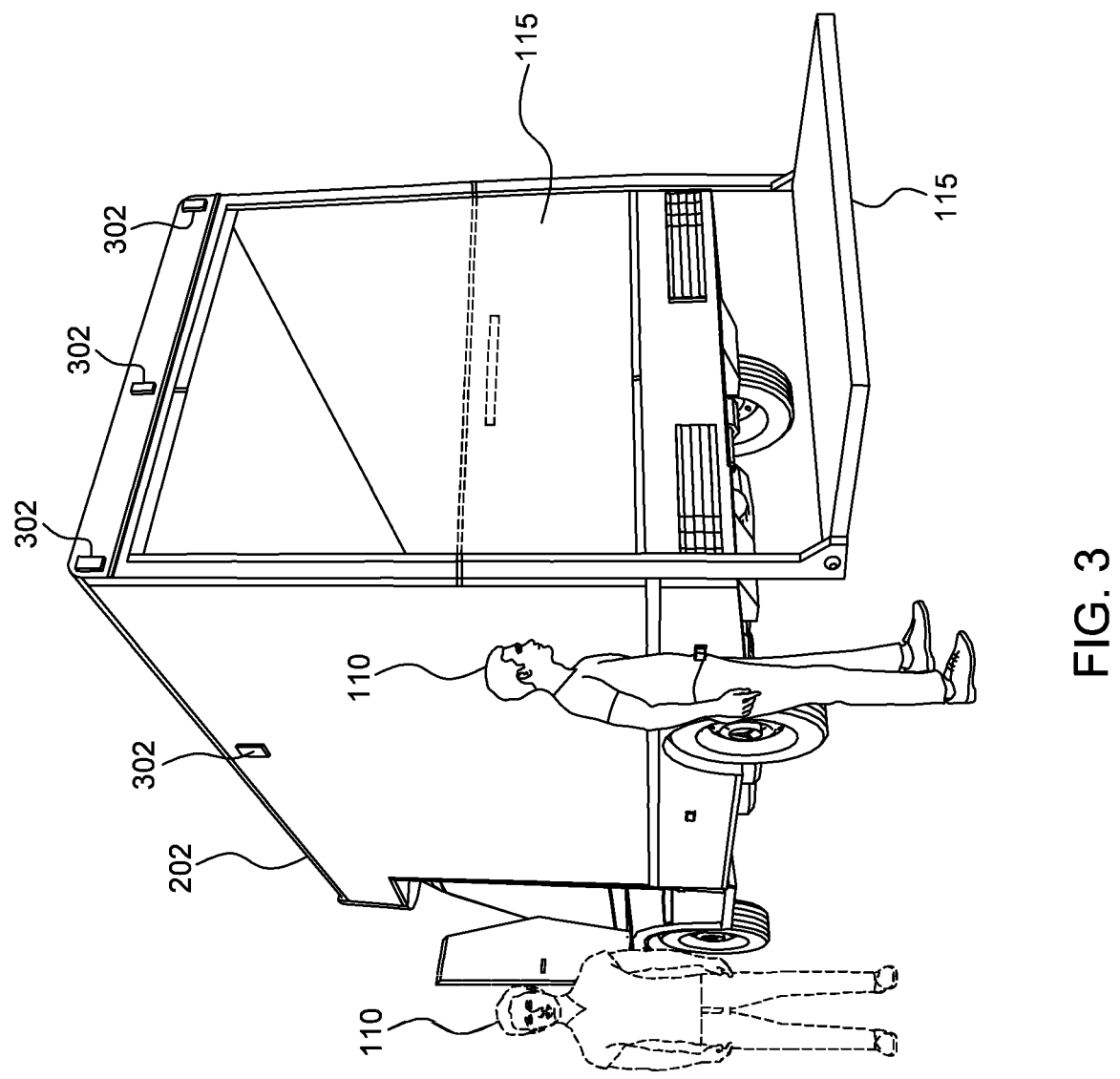
FIG. 3 depicts an exemplary tail lift movement from a retracted position to an extended position in accordance with the present disclosure.

An exemplary tail lift movement from the retracted position to the extended position is shown in FIG. 3. As shown in FIG. 3, the vehicle 202 may include one or more first detection unit(s) 302 that may be vehicle cameras and/or radar sensors. The first detection unit 302 may be disposed at various vehicle locations, e.g., vehicle side portions, vehicle rear portion, etc. Although FIG. 3 depicts the first detection unit 302 to be disposed at vehicle exterior portions, the first detection unit 302 may additionally be disposed at vehicle interior portions. The first detection unit 302 may be configured to detect user location in proximity to the vehicle 202 and may transmit inputs to the processor 246 via the transceiver 244. In an exemplary aspect, when the user 110 exits the vehicle 202 from a vehicle interior portion to a vehicle exterior portion, the tail lift 115 may be in the retracted position. As the user 110 moves towards the vehicle rear portion after exiting the vehicle 202 and starts to look at the tail lift 115, as shown in FIG. 3, the processor 246 may move the tail lift 115 from the retracted position to the extended position. When the tail lift 115 may be in the extended position, the user 110 may load the cargo 125 on the tail lift 115, as described above in conjunction with FIG. 1.

In some aspects, responsive to moving the tail lift 115 to the extended position, the processor 246 may activate a vehicle parking brake via the VCU 212. Activating the vehicle parking brake may ensure that the vehicle 202 may not move when the user 110 may be placing the cargo 125 on the tail lift 115. In additional aspects, responsive to moving the tail lift 115 to the extended position, the processor 246 may determine a vehicle cargo bed pitch and/or a tail lift pitch by using the first detection unit 302. Specifically, by using the inputs obtained from the vehicle cameras and/or the radar sensors, the processor 246 may determine the vehicle cargo bed pitch and/or the tail lift pitch. In this case, the first detection unit 302 may be configured to detect a vehicle cargo bed inclination angle relative to the ground and a tail lift inclination angle relative to the ground when the tail lift 115 may be in the extended position. Responsive to detecting respective angles, the first detection unit 302 may send the detected angles to the processor 246. The processor 246 may obtain the angles and compare the obtained angles with a predefined threshold angle (that may be pre-stored in the memory 248, 220). The processor 246 may determinate that the vehicle cargo bed pitch and/or the tail lift pitch may need adjustment when the obtained angles may be greater than the predefined threshold angle. Stated another way, based on the inputs from the first detection unit 302, the processor 246 may determine whether the vehicle cargo bed pitch and/or the tail lift pitch may be within or outside a predefined pitch range (that may be pre-stored in the memory 248, 220). The processor 246 may determine that the vehicle cargo bed pitch and/or the tail lift pitch may need adjustment when the respective pitch may be outside the predefined pitch range. In an exemplary aspect, for efficient loading and unloading of cargo by using the tail lift 115, tail lift should be touching the ground with substantially small pitch.

Responsive to determining that the vehicle cargo bed inclination angle may be greater than the predefined threshold angle, or the vehicle cargo bed pitch may be outside the predefined pitch range, the processor 246 may automatically adjust a vehicle cargo bed inclination or vehicle cargo bed pitch so that the vehicle cargo bed 120 may be level with the ground. In some aspects, the processor 246 may adjust the vehicle cargo bed pitch by using vehicle air suspension. In other aspects, when the vehicle 202 may not be equipped with the vehicle air suspension, the processor 246 may output a notification, via the transceiver 244 and the speaker 242, instructing the user 110 to move the vehicle 202 to another location where the ground may be level (thereby enabling the vehicle cargo bed 120 to be level with the ground). In additional aspects, the processor 246 may also transmit the notification, via the transceiver 244, to the user device 204 and/or the server 206. Responsive to receiving the notification, the user 110 may move the vehicle 202 (after moving the tail lift 115 back to the retracted position and disabling the vehicle parking brake) to another location where the vehicle cargo bed 120 may be level with the ground.

In further aspects, responsive to determining that the tail lift inclination angle may be greater than the predefined threshold angle, or the tail lift pitch may be outside the predefined pitch range, the processor 246 may automatically adjust a tail lift inclination or tail lift pitch so that the tail lift 115 may be level with the ground, and may touch the ground. The processor 246 may adjust the tail lift pitch in parallel to or after adjusting the vehicle cargo bed pitch (automatically or via the user 110).

Although the description above describes an aspect where the processor 246 determines the vehicle cargo bed pitch and/or the tail lift pitch by using inputs obtained from the first detection unit 302, in other aspects, the vehicle 202 may include dedicated pitch sensors installed on the vehicle cargo bed 120 and the tail lift 115. In this case, the processor 246 may determine whether the vehicle cargo bed pitch and/or the tail lift pitch may be within or outside the predefined pitch range based on inputs obtained from respective pitch sensors installed on the vehicle cargo bed 120 and the tail lift 115.

In additional aspects, in parallel to or responsive to adjusting the vehicle cargo bed pitch and/or the tail lift pitch, the processor 246 may actuate one or more vehicle lights based on user location in proximity to the vehicle 202, ambient light brightness, and vehicle interior portion light brightness. Specifically, in this case, the processor 246 may obtain inputs from the first detection unit 302 and may actuate the vehicle lights based on the obtained inputs. In this exemplary aspect, the first detection unit 302 (i.e., the vehicle interior and/or exterior cameras, and/or the radar sensors) may be configured to determine user location in proximity to the vehicle 202, and the ambient light brightness and the vehicle interior portion light brightness. The processor 246 may actuate the vehicle lights based on the inputs obtained from the first detection unit 302, so that it may be convenient for the user 110 to load/unload the cargo 125 to/from the vehicle cargo bed 120 by using the tail lift 115. For example, the processor 246 may automatically actuate a vehicle interior light to illuminate vehicle cargo area, when the processor 246 determines that the user 110 may be in proximity to the vehicle rear portion and it may be dark in the vehicle interior portion/vehicle cargo area. In other aspects, the processor 246 may automatically actuate vehicle reverse/brake lights, license plate lights, etc.

The user 110 may use the tail lift 115 to load/unload the cargo 125 when the vehicle cargo bed pitch and/or the tail lift pitch may be within the predefined pitch range (e.g., post pitch adjustment by the processor 246). As described above in conjunction with FIG. 1, the user 110 may dispose or place the cargo 125 on the tail lift 115 when the tail lift 115 may be in the extended position. Responsive to placing the cargo 125 on the tail lift 115, the user 110 may send a command to the vehicle 202 (specifically to the tail lift control system 214) to move the tail lift 115 from the extended position to the elevated position. As described above, the user 110 may send the command via the user device 204, gesture command, audio command, or by mechanically actuating the tail lift actuator (not shown).

In some aspects, the processor 246 may perform one or more additional checks before enabling the user 110 (or "accepting" user command) to move the tail lift 115 from the extended position to the elevated position. For example, the processor 246 may check whether the user 110 has placed the cargo 125 in an optimal location on the tail lift 115, presence of any obstruction in proximity to the tail lift 115, and/or whether the cargo weight on the tail lift 115 is within a permissible weight threshold, before enabling the user 110 to move the tail lift 115 from the extended position to the elevated position. These additional checks are described below. The order of description of the checks below should not be construed as the sequential order in which the processor 246 may perform these checks. The processor 246 may perform these checks in any order, without departing from the present disclosure scope.

In some aspects, responsive to the user 110 placing the cargo 125 on the tail lift 115, the first detection unit 302 may detect a placement location (or load distribution) of the cargo 125 on the tail lift 115. For example, the first detection unit 302 may detect whether user 110 has placed the cargo 125 at a tail lift center position, or at a location that may be deviated from the tail lift center position. The first detection unit 302 may transmit the detected placement location to the processor 246. Responsive to obtaining the placement location from the first detection unit 302, the processor 246 may determine whether a predefined condition is met. In some aspects, the predefined condition may be met when the placement location may be deviated from the tail lift center position by more than a predefined threshold deviation (that may be pre-stored in the memory 220, 248). Specifically, in this case, the processor 246 may compare a distance between the detected placement location and the tail lift center position location. The processor 246 may determine that the predefined condition may be met when the distance may be greater than the predefined threshold deviation. An exemplary snapshot of a cargo placement location deviated from the tail lift center position is shown in FIG. 4.

Figure 4:
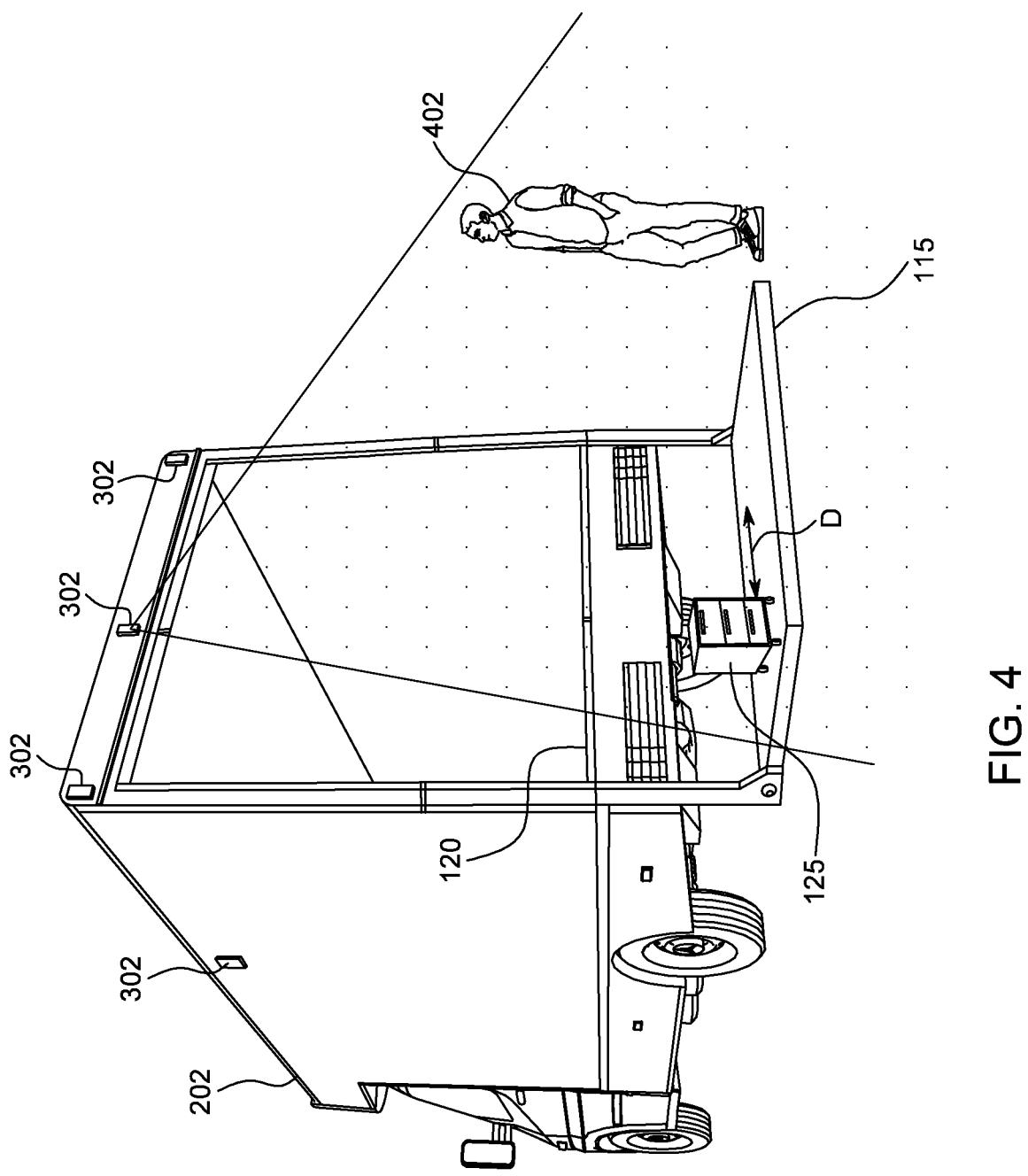
FIG. 4 depicts an exemplary snapshot of a tail lift in the extended position in accordance with the present disclosure.

Specifically, FIG. 4 depicts an exemplary snapshot of the tail lift 115 in the extended position, and the cargo 125 placed on the tail lift 115 at a placement location that may be deviated by a distance "D" from the tail lift center position. As shown in FIG. 4, the first detection unit 302 may detect the placement location by using detection unit field of view (FOV). The processor 246 may obtain the placement location from the first detection unit 302, and may determine the distance "D" based on tail lift dimensions that may be pre-stored in the memory 220, 248. The processor 246 may then compare the distance "D" with the predefined threshold deviation and determine that the predefined condition may be met when the distance "D" may be greater than the predefined threshold deviation.

In additional aspects, when the user 110 places the cargo 125 on the tail lift 115, the first detection unit 302 may determine the tail lift inclination angle relative to ground and may send the determined angle to the processor 246. Responsive to receiving the tail lift inclination angle from the first detection unit 302, the processor 246 may compare the angle with a predefined tilt threshold angle. The processor 246 may determine that the predefined condition may not be met if the tail lift inclination angle may be less than the predefined tilt threshold angle (even if the cargo 125 may be placed away from the tail lift center position location). On the other hand, the processor 246 may determine that the predefined condition may be met when the tail lift inclination angle may be equal to more than the predefined tilt threshold angle.

Responsive to determining that the predefined condition may be met, the processor 246 may transmit, via the transceiver 244, a first notification to the speaker 242, the user device 204 and/or the server 206. In some aspects, the first notification may include instructions for the user 110 to adjust the cargo placement location on the tail lift 115 such that the cargo 125 may be placed on or in proximity to the tail lift center position. In some aspects, the speaker 242 may audibly output the first notification, and the user 110 may adjust the cargo placement location on the tail lift 115 responsive to receiving/hearing the first notification.

In some aspects, the processor 246 may disable tail lift movement when the processor 246 determines that the cargo placement location may be deviated from the tail lift center position by more than the predefined threshold deviation. Stated another way, the processor 246 may not accept user command to move the tail lift 115 from the extended position to the elevated position when the cargo placement location may be deviated from the tail lift center position by more than the predefined threshold deviation (or when the predefined condition may be met). The processor 246 may enable the tail lift movement when the user 110 may adjust the cargo placement location to be on or in proximity to the tail lift center position, responsive to receiving/hearing the first notification.

In additional aspects, responsive to the user 110 placing the cargo 125 on the tail lift 115, the first detection unit 302 may detect presence of an obstruction on or in proximity to the tail lift 115. In some aspects, the obstruction may be, for example, an obstructing object such as a rope or any other similar object on or in proximity to the tail lift 115. In other aspects, the obstruction may be a pedestrian or any other user who may not be the user 110. Stated another way, the obstruction may be any user who may not be required to be in proximity to the tail lift 115. Responsive to detecting obstruction presence in proximity to the tail lift 115, the first detection unit 302 may send inputs to the processor 246.

Responsive to obtaining the inputs from the first detection unit 302, the processor 246 may determine whether the obstruction may be the user 110 or any other user who may not be required to be in proximity to the tail lift 115. In some aspects, the processor 246 may determine whether the obstruction may be the user 110 or any other user based on facial recognition technology and the inputs obtained from the first detection unit 302. For example, the processor 246 may compare obstruction facial features (if the obstruction is a user) with the facial features of the user 110 that may be pre-stored in the memory 220, 248. The processor 246 may determine that the obstruction may be the user 110 when the obstruction facial features match with the facial features of the user 110 stored in the memory 220, 248. On the other hand, the processor 246 may determine that the obstruction may be any other user when the facial features do not match.

Responsive to determining that the obstruction may not be the user 110, the processor 246 may determine whether the obstruction may be present within a predefined range (that may be pre-stored in the memory 220, 248) of the tail lift 115. Specifically, based on the inputs obtained from the first detection unit 302, the processor 246 may estimate a distance between the obstruction and the tail lift 115 (specifically tail lift edges). The processor 246 may then compare the estimated distance with the predefined range. The processor 246 may determine that the predefined condition may be met when the estimated distance may be less than the predefined range. Stated another way, the processor 246 may determine that the predefined condition may be met when any object or user (who may be different from the user 110) may be close to the tail lift 115. An exemplary snapshot of a user 402 located close to (within the predefined range of) the tail lift 115 is shown in FIG. 4.

Responsive to determining that the obstruction may be within the predefined range of the tail lift 115, the processor 246 may output a second notification instructing the obstruction to move away. The processor 246 may output, via the transceiver 244, the second notification via the speaker 242, the user device 204 and/or the server 206, similar to outputting the first notification described above. The second notification may include instructions to move the obstruction away from the tail lift 115 such that the distance between the obstruction and the tail lift 115 may be greater than the predefined range. If the obstruction is a user (different from the user 110), the user may hear the second notification via the speaker 242 and may move away. If the obstruction is an object (e.g., a rope), the user 110 may move the obstruction away from the tail lift 115, responsive to receiving/hearing the second notification.

In some aspects, the processor 246 may disable the tail lift movement when the processor 246 determines that the obstruction may be within the predefined range of the tail lift 115. Stated another way, the processor 246 may not accept user command to move the tail lift 115 from the extended position to the elevated position when the obstruction may be located within the predefined range of the tail lift 115. The processor 246 may enable the tail lift movement when the obstruction may be moved away from the tail lift 115 such that the distance between the obstruction and the tail lift 115 may be greater than the predefined range.

Figure 5:
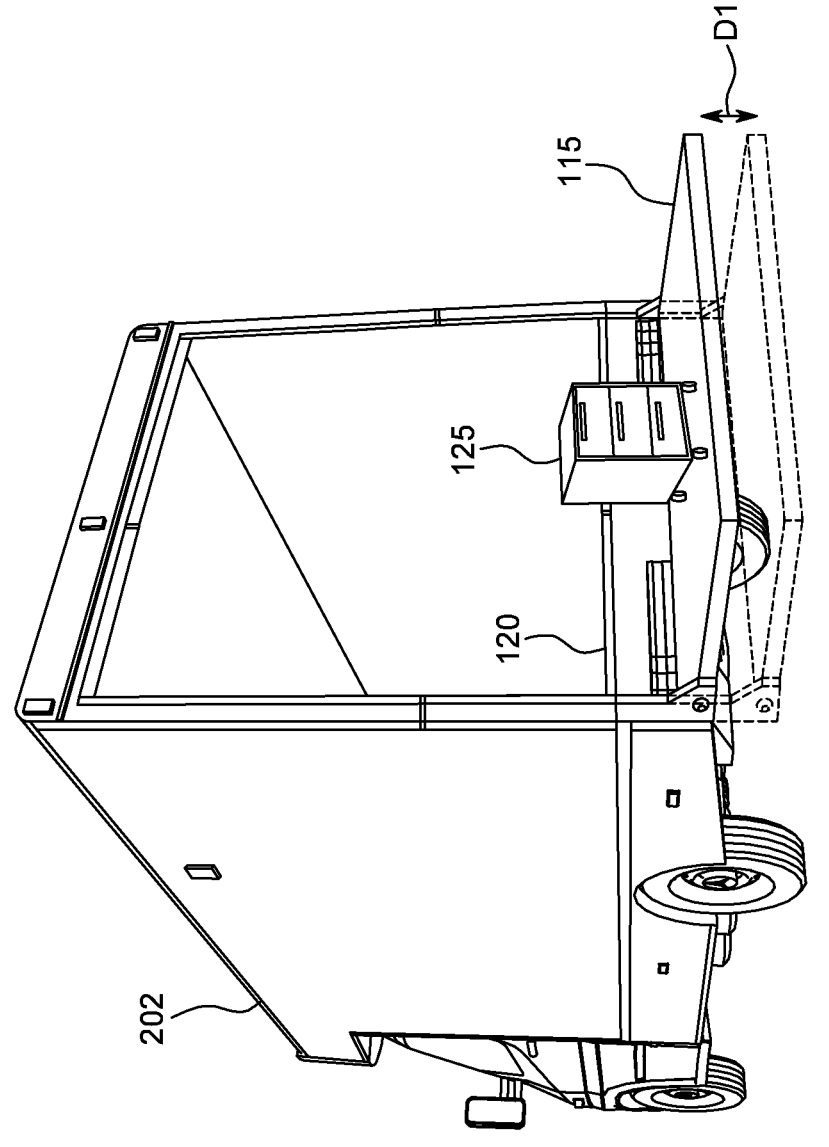
FIG. 5 depicts an exemplary snapshot of a tail lift vertical movement in accordance with the present disclosure.

In further aspects, the processor 246 may be configured to determine whether the cargo weight on the tail lift 115 may be greater than a predefined weight threshold (that may be pre-stored in the memory 220, 248) based on inputs obtain from the tail lift weight sensors (which may be referred to as a "second detection unit", not shown). Specifically, in this case, responsive to determining that the cargo placement location may be in proximity to the tail lift center position and there may be no obstructions within the predefined range of the tail lift 115, the processor 246 may cause the tail lift 115 to move vertically up from the extended position by a small displacement "D1", as shown in FIG. 5. FIG. 5 depicts an exemplary snapshot of a tail lift vertical movement from the extended position.

Responsive to the tail lift 115 being moved vertically up by the displacement "D1", the second detection unit may determine the cargo weight that may be placed on the tail lift 115. The second detection unit may determine the cargo weight based on the hydraulic pressure or the power needed to the move the tail lift 115 vertically up. The second detection unit may transmit the determined cargo weight to the processor 246, which may compare the cargo weight with the predefined weight threshold. Responsive to determining that the cargo weight may be greater than the predefined weight threshold, the processor 246 may cause the tail lift 115 to move vertically down back to the extended position. The processor 246 may further output, via the transceiver 244 and the speaker 242 (or the user device 204 and/or the server 206), a third notification instructing the user 110 to reduce the cargo weight on the tail lift 115.

Responsive to the user 110 reducing the cargo weight, the processor 246 may enable the user 110 (or "accept" user command) to move the tail lift 115 from the extended position to the elevated position. The user 110 may load the cargo 125 from the tail lift 115 to the vehicle cargo bed 120 when the tail lift 115 may be disposed at the elevated position, as described above in conjunction with FIG. 1. Further, as described above, the user 110 may iteratively command the processor 246 to move the tail lift 115 between the extended position and the elevated position till all cargo packages may be loaded on the vehicle cargo bed 120. In some aspects, the processor 246 may additionally prompt (e.g., by outputting a notification via the speaker 242) the user 110 to stand on the tail lift 115 when the tail lift 115 may be moved from the extended position to the elevated position. This may enable the user 110 to conveniently load the cargo 125 to the vehicle cargo bed 120, when the tail lift 115 may be in the elevated position.

In additional aspects, the processor 246 may continue to obtain inputs from the first detection unit 302 when the tail lift 115 may be moved iteratively between the extended position and the elevated position. Based on the inputs obtained from the first detection unit 320, the processor 246 may determine when the cargo 125 may be rolling off or tipping from the tail lift 115 as the tail lift 115 may be moving between the extended position and the elevated position. Responsive to determining that the cargo 125 may be rolling off or tipping from the tail lift 115, the processor 246 may output a notification (via the speaker 242, the user device 204 and/or the server 206) to the user 110, so that the user 110 may perform remedial actions. In other aspects, the processor 246 may automatically and dynamically adjust the tail lift pitch or tail lift inclination when the tail lift 115 may be moving between the extended position and the elevated position, so that the cargo 125 may not slip or roll off from the tail lift 115.

When all the cargo packages may be loaded in the vehicle cargo bed 120, the user 110 may send a command (e.g., via the user device 204) to the processor 246 to move and lock the tail lift 115 in the retracted position. Responsive to receiving the command, the processor 246 may cause the tail lift 115 to move to the retracted position and may lock the tail lift 115 via the tail lift locks. In some aspects, the user 110 may drive the vehicle 202 when the tail lift 115 may be locked in the retracted position. In additional aspects, if the vehicle 202 is an autonomous vehicle, the processor 246 may automatically adjust cargo position packages in the vehicle cargo bed 120, based on package weight and size. In this case, the processor 246 may further control cargo package movement and tail lift movement to facilitate in cargo loading and unloading operation.

In yet another aspect, if the processor 246 determines that an adverse incident associated with the user 110 (or any other user) may have happened in proximity to the tail lift 115, based on the inputs obtained from the first detection unit 302, the processor 246 may send an alert notification to the server 206 and/or the authorities.

Figure 6:
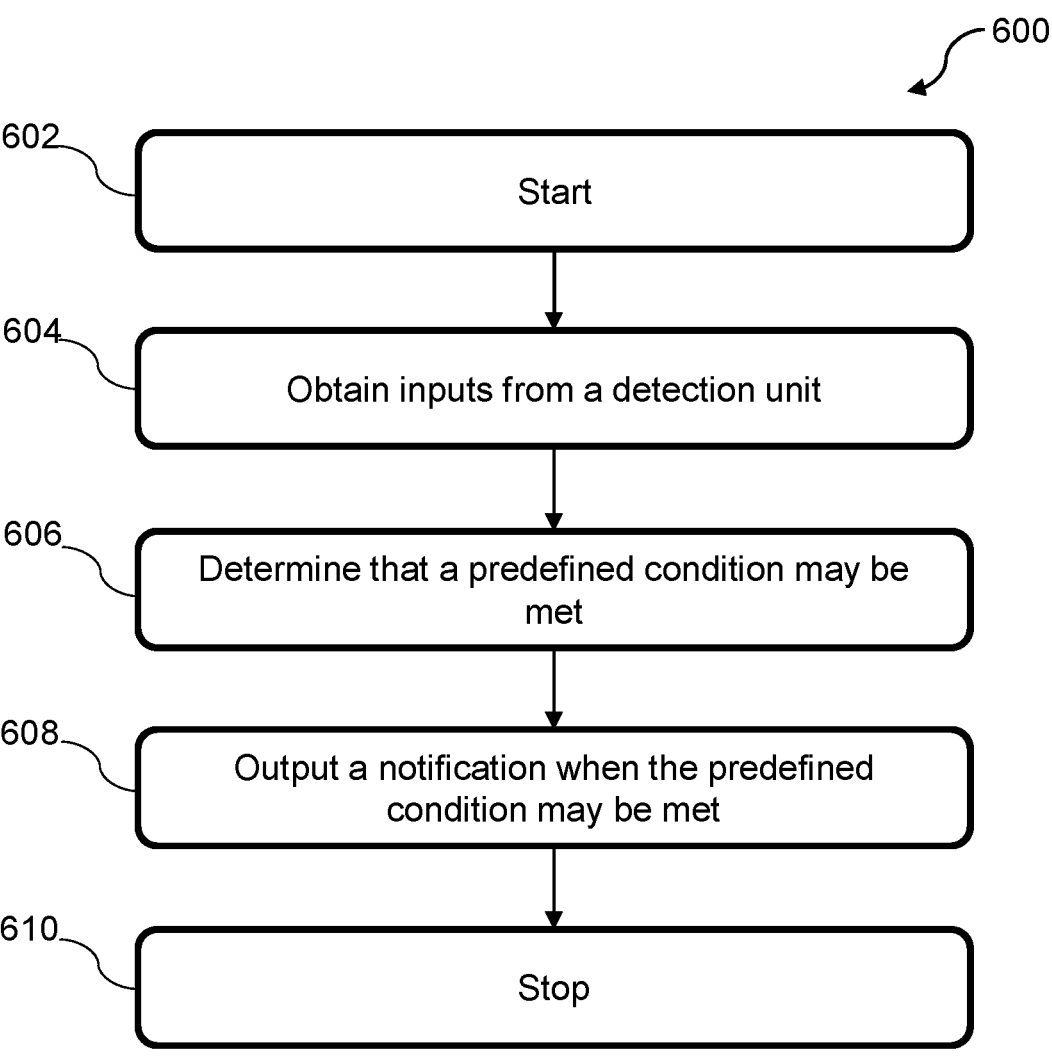
FIG. 6 depicts a flow diagram of an example method to facilitate loading and unloading of vehicle cargo by using a tail lift in accordance with the present disclosure.

FIG. 6 depicts a flow diagram of an example method 600 to facilitate loading and unloading of the cargo 125 by using the tail lift 115 in accordance with the present disclosure. FIG. 6 may be described with continued reference to prior figures, including FIGS. 1-5. The following process is exemplary and not confined to the steps described hereafter. Moreover, alternative embodiments may include more or less steps that are shown or described herein and may include these steps in a different order than the order described in the following example embodiments.

The method 600 starts at step 602. At step 604, the method 600 may include obtaining, by the processor 246, the inputs from the first detection unit 302. As described above, the processor 246 may obtain the cargo placement location on the tail lift 115 and obstruction presence in proximity to the tail lift 115 from the first detection unit 302.

Responsive to obtaining the inputs from the first detection unit 302, at step 606, the processor 246 may determine that the predefined condition may be met. As described above, the processor 246 may determine that the predefined condition may be met when the cargo placement location may be deviated from the tail lift center position by more than the predefined deviation threshold or when the obstruction may be within the predefined range of the tail lift 115.

At step 608, the method 600 may include outputting, by the processor 246, a notification when the predefined condition may be met. The notification may include instructions to adjust the cargo placement location or move the obstruction away from the tail lift, as described above.

The method 600 may end at step 610.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A vehicle comprising:
a tail lift configured to move between a retracted position and an extended position, wherein the tail lift is disposed perpendicular to a vehicle cargo bed in the retracted position, and wherein the tail lift is disposed parallel to the vehicle cargo bed in the extended position;
a first detection unit configured to:
detect a location of a vehicle operator in proximity to the vehicle;
detect a placement location of a cargo on the tail lift when the tail lift is in the extended position, and
detect an obstruction in proximity to the tail lift; and
a processor communicatively coupled with the tail lift and the first detection unit, wherein the processor is configured to:
obtain inputs from the first detection unit;
determine that the vehicle operator has moved from a vehicle interior portion to a vehicle exterior portion based on the location of the vehicle operator;
cause the tail lift to move from the retracted position to the extended position responsive to a determination that the vehicle operator has moved from the vehicle interior portion to the vehicle exterior portion;
determine that a predefined condition is met based on the inputs, wherein the predefined condition is met when the placement location is deviated from a tail lift center position by more than a predefined deviation threshold or when the obstruction is within a predefined range of the tail lift; and
output a first notification responsive to a determination that the predefined condition is met, wherein the first notification comprises instructions to adjust the placement location or move the obstruction away from the tail lift.

2. The vehicle of claim 1, wherein the first detection unit is further configured to:
detect a vehicle cargo bed inclination angle relative to ground when the tail lift is in the extended position;
detect a tail lift inclination angle relative to the ground when the tail lift is in the extended position; and
detect an ambient light brightness and a vehicle interior portion light brightness.

3. The vehicle of claim 2, wherein the predefined condition is met when the tail lift inclination angle is greater than a predefined tilt angle threshold.

4. The vehicle of claim 2, wherein the processor is further configured to:
determine that the vehicle cargo bed inclination angle or the tail lift inclination angle relative to the ground is greater than a predefined threshold angle based on the inputs from the first detection unit when the tail lift moves to the extended position; and
adjust a vehicle cargo bed inclination or a tail lift inclination responsive to a determination that the vehicle cargo bed inclination angle or the tail lift inclination angle relative to the ground is greater than the predefined threshold angle.

5. The vehicle of claim 2, wherein the processor is further configured to actuate one or more vehicle lights based on the location of the vehicle operator, the ambient light brightness, and the vehicle interior portion light brightness.

6. The vehicle of claim 1, further comprising a vehicle speaker configured to audibly output the first notification.

7. The vehicle of claim 6, wherein the processor outputs the first notification via the vehicle speaker instructing the vehicle operator to adjust the placement location to be in proximity to the tail lift center position when the processor determines that the placement location is deviated from the tail lift center position by more than the predefined deviation threshold.

8. The vehicle of claim 7, wherein the processor is further configured to:
disable a tail lift movement when the processor determines that the placement location is deviated from the tail lift center position by more than the predefined deviation threshold; and
enable the tail lift movement when the placement location is in proximity to the tail lift center position.

9. The vehicle of claim 6, wherein the obstruction is a pedestrian or an obstructing object disposed on the tail lift, and wherein the processor outputs the first notification via the vehicle speaker instructing the obstruction to be moved away from the tail lift such that a distance between the obstruction and the tail lift is greater than the predefined range.

10. The vehicle of claim 9, wherein the processor is further configured to:
disable a tail lift movement when the processor determines that the obstruction is within the predefined range of the tail lift; and
enable the tail lift movement when the obstruction is away from the tail lift.

11. The vehicle of claim 1, further comprising a second detection unit configured to detect a weight of the cargo on the tail lift.

12. The vehicle of claim 11, wherein the processor is further configured to:
cause the tail lift to move vertically up a predefined distance from the extended position when the cargo is disposed on the tail lift;
determine the weight based on second inputs received from the second detection unit;
cause the tail lift to move vertically down back to the extended position when the weight is greater than a predefined weight threshold; and
output a second notification instructing a vehicle operator to reduce the weight on the tail lift when the weight is greater than the predefined weight threshold.

13. The vehicle of claim 12, wherein the processor is further configured to adjust a tail lift inclination based on the weight and the placement location when the weight is less than the predefined weight threshold, and wherein the processor adjusts the tail lift inclination such that the cargo does not slip or roll from the tail lift when the tail lift is moved vertically up from the extended position.

14. The vehicle of claim 1, further comprising a transceiver configured to receive a trigger signal from at least one of a communication device associated with the vehicle operator, a vehicle Human-Machine Interface (HMI), and an actuator disposed at the vehicle, wherein the processor obtains the inputs from the first detection unit when the transceiver receives the trigger signal.

15. A method to facilitate loading and unloading of cargo by using a tail lift of a vehicle, the method comprising:
obtaining, by a processor, inputs from a detection unit, wherein the detection unit is configured to:
detect a location of a vehicle operator in proximity to the vehicle;
detect a placement location of a cargo on the tail lift, wherein the tail lift is configured to move between a retracted position and an extended position, wherein the tail lift is disposed perpendicular to a vehicle cargo bed in the retracted position, and wherein the tail lift is disposed parallel to the vehicle cargo bed in the extended position; and detect an obstruction in proximity to the tail lift;

determining, by the processor, that the vehicle operator has moved from a vehicle interior portion to a vehicle exterior portion based on the location of the vehicle operator;

causing, by the processor, the tail lift to move from the retracted position to the extended position responsive to a determination that the vehicle operator has moved from the vehicle interior portion to the vehicle exterior portion;

determining, by the processor, that a predefined condition is met based on the inputs, wherein the predefined condition is met when the placement location is deviated from a tail lift center position by more than a predefined deviation threshold or when the obstruction is within a predefined range of the tail lift; and outputting, by the processor, a notification responsive to a determination that the predefined condition is met, wherein the notification comprises instructions to adjust the placement location or move the obstruction away from the tail lift.

16. The method of claim 15, wherein the predefined condition is met when a tail lift inclination angle relative to ground is greater than a predefined tilt angle threshold.

17. The method of claim 15, wherein the obstruction is a pedestrian or an obstructing object disposed on the tail lift.

18. The method of claim 15, wherein outputting the notification comprises outputting the notification instructing a vehicle operator to adjust the placement location to be in proximity to the tail lift center position when the placement location is deviated from the tail lift center position by more than the predefined deviation threshold.

19. The method of claim 15, wherein outputting the notification comprises outputting the notification instructing the obstruction to be moved away from the tail lift such that a distance between the obstruction and the tail lift is greater than the predefined range when the obstruction is within the predefined range of the tail lift.

20. A non-transitory computer-readable storage medium having instructions stored thereupon which, when executed by a processor, cause the processor to:

obtain inputs from a detection unit of a vehicle, wherein the detection unit is configured to:

detect a location of a vehicle operator in proximity to the vehicle;

detect a placement location of a cargo on a tail lift of the vehicle, wherein the tail lift is configured to move between a retracted position and an extended position, wherein the tail lift is disposed perpendicular to a vehicle cargo bed of the vehicle in the retracted position, and wherein the tail lift is disposed parallel to the vehicle cargo bed in the extended position; and detect an obstruction in proximity to the tail lift;

determine that the vehicle operator has moved from a vehicle interior portion to a vehicle exterior portion based on the location of the vehicle operator;

cause the tail lift to move from the retracted position to the extended position responsive to a determination that the vehicle operator has moved from the vehicle interior portion to the vehicle exterior portion;

determine that a predefined condition is met based on the inputs, wherein the predefined condition is met when the placement location is deviated from a tail lift center position by more than a predefined deviation threshold or when the obstruction is within a predefined range of the tail lift; and output a notification responsive to a determination that the predefined condition is met, wherein the notification comprises instructions to adjust the placement location or move the obstruction away from the tail lift.

* * * * *